United States Patent [19]

Ashany et al.

[11] 3,735,362

[45] May 22, 1973

[54] SHIFT REGISTER INTERCONNECTION SYSTEM

[75] Inventors: Ron Ashany; Leo M. Audretsch, Jr.; Michael J. Pisterzi, all of Poughkeepsie, N.Y.

[73] Assignee: International Business Machines Corporation, Armonk, N.Y.

[22] Filed: Sept. 22, 1971

[21] Appl. No.: 182,775

[52] U.S. Cl. .......... 340/172.5

[51] Int. Cl. .......... G06f 13/00

[58] Field of Search .......... 340/172.5

[56] References Cited

UNITED STATES PATENTS

| | | | |
|---|---|---|---|
| 2,939,120 | 5/1960 | Estrems et al. | 340/172.5 |
| 3,132,324 | 5/1964 | Estrems | 340/172.5 |
| 3,274,556 | 9/1966 | Paul et al | 340/172.5 |
| 3,386,082 | 5/1968 | Stafford et al | 340/172.5 |
| 3,564,502 | 2/1971 | Boehner et al. | 340/172.5 |
| 3,623,011 | 11/1971 | Baynard et al. | 340/172.5 |
| 3,659,271 | 4/1972 | Collins et al | 340/172.5 |

*Primary Examiner*—Paul J. Henon
*Assistant Examiner*—James D. Thomas
*Attorney*—William S. Robertson, William N. Barret Jr. and J. Janan

[57] ABSTRACT

Units of a data processing system communicate on a ring connection of shift register stages. The number of stages in a shift register is made small to avoid the delays that accompany the long data paths of a large ring system. Interconnecting stages are provided to direct a message on a first ring to a second ring according to an address contained in the message. Several useful configurations are disclosed. With this arrangement, a system of small rings can be expanded without correspondingly lengthening the average time for transmitting a message in the system.

10 Claims, 6 Drawing Figures

INVENTORS
RON ASHANY
LEO M. AUDRETSCH, JR
MICHAEL J. PISTERZI

BY W. Robertson

ATTORNEY

SHIFT REGISTER INTERCONNECTION SYSTEM

INTRODUCTION

This invention relates to a system of shift registers that are connected in a ring for interconnecting components of a data processing system. A system of this general type is disclosed in the Journal of the ACM, Vol. 13, No. 1, January 1966, Pages 27 and 28. In such a system, a series of shift registers are connected in a ring arrangement so that a message placed in one shift register stage is propagated around the ring through all of the register stages until it is removed. Components of a data processing system can each be associated with an individual stage of the ring to receive messages entered at other stages of the ring and to insert messages into the ring that are intended for other components. Thus, a message includes data that is to be transmitted from one unit to another and it includes various control bits, such as the address of the receiving stage of the ring. Such a system for interconnecting data processing system components can be contrasted with a crosspoint switch that selectively connects any component directly to any other component. Each system has recognized advantages and problems. One of the problems in a shift register ring is that the delay in propagating a message from one unit to another increases as the number of intervening stages in the ring is increased. Since the goal of such a system is to interconnect a large number of processors, memories, and other devices, the delays associated with a large ring are very serious. A general object of this invention is to provide a new and improved shift register ring interconnection system that reduces the delay between intercommunicating stages of a ring system.

SUMMARY OF THE INVENTION

According to this invention, a ring is limited in size to an optimum value that maintains a useful number of units closely interconnected on a ring. Two or more rings may be provided in the system and each ring has one or more stages that provide interconnection from one ring to another. These stages include logic circuits for recognizing addresses and other control bits in messages and gates for transmitting the message along the same ring or transferring the message to another ring. These stages also include appropriate circuits for other functions such as buffering.

Where a system has more than two rings and also where a ring has more than two interconnections to other rings, alternate pathways are provided between interconnecting units. Means is provided for selecting among these pathways according to the most direct route, as indicated by the address or for bypassing portions of the system that may be inoperable or may be overloaded with other messages or with messages of higher priority. The specific embodiment of the invention will present additional features and advantages that this novel ring interconnection system provides.

THE DRAWINGS

THE SYSTEM OF THE DRAWINGS

Figure 1:
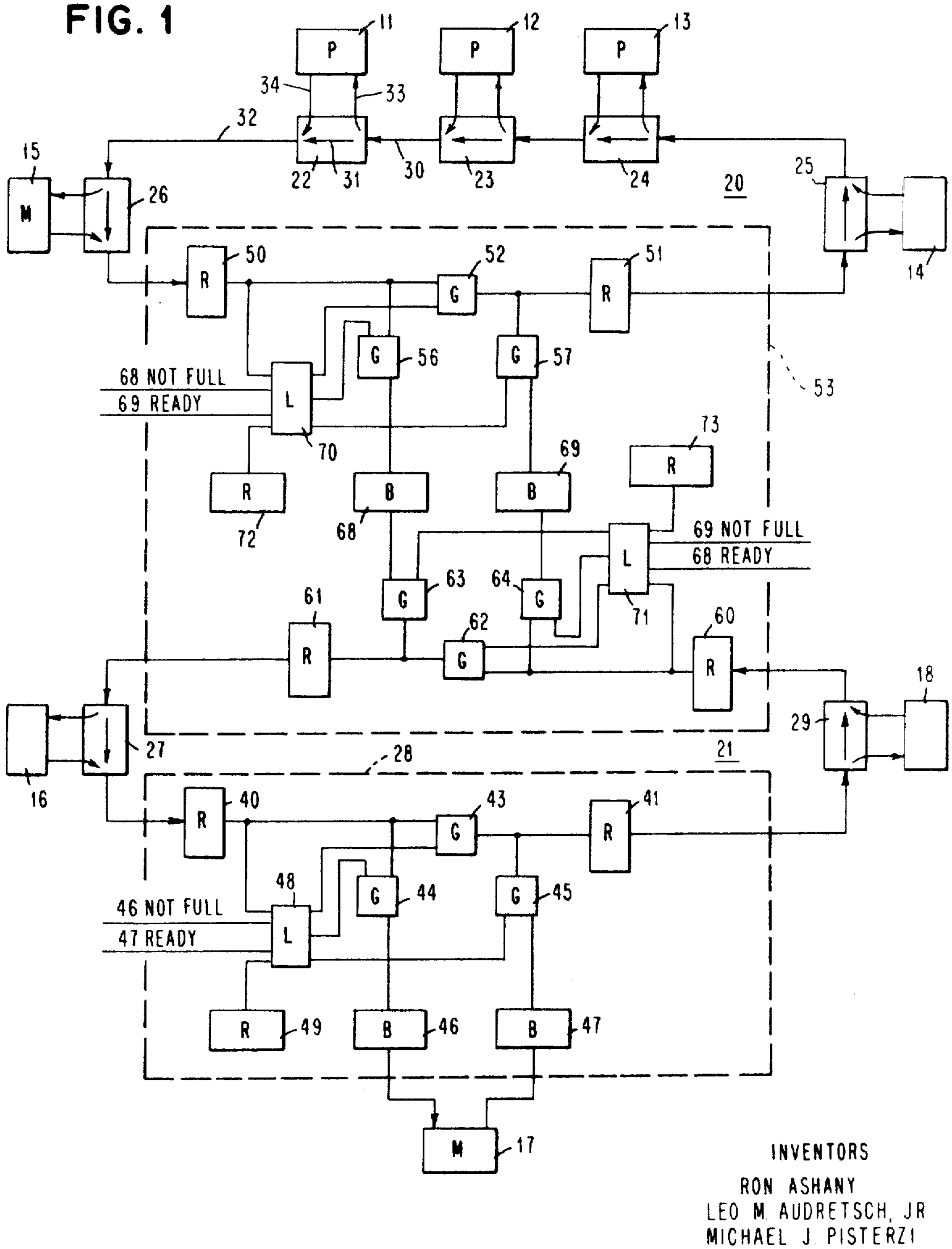
FIG. 1 shows a ring interconnection system according to this invention and the specific logic functions of a ring shift register stage and an interconnection stage.

Introduction to the System of FIG. 1

In the system of FIG. 1, a group of processors, memories, and other devices 11 through 18 are interconnected by means of two shift register rings 20 and 21. For generality, a processor, memory or other device will be called a "load" to the ring. Each ring includes several shift register stages 22 through 29. Stage 28 is shown in detail and the other stages are shown schematically with arrows indicating the flow of data through each stage. For example, arrowed lines 30, 31 and 32 show the flow of data from the output of register stage 23 through stage 22 to the input of stage 26. Logic circuits that are shown for stage 28 and described later also provide a path from the input 30 of stage 22 to a line 33 that is an input to processor 11. Similarly, a line 34 from processor 11 is connected through logic circuits in register stage 22 to the line 32 connecting the output of stage 22 to the input of stage 26. As will be explained later in detail, any load 11 through 15 communicates with any other load by placing a message with appropriate control bits on ring 20. Similarly, the three illustrative loads 16, 17 and 18 on ring 21 intercommunicate through register stages 27, 28 and 29.

Figure 5:
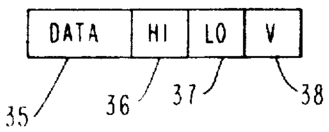
FIG. 5 shows a format for a message to be transmitted on the ring.

FIG. 5 shows a message format. The message includes a data section 35 that is to be transmitted to a load, an address that includes a high order portion 36 and a low order portion 37 and a vacancy indicator 38. Address portion 36 identifies the ring and address portion 37 further identifies a load of the ring. Other control bit fields will be suggested by various operations to be performed on the messages. For example, the messages may advantageously have an error correcting code field and the register stage may contain logic circuits for checking or correcting the control fields. Suitable component circuits are well known and are not specifically shown in the drawing.

Register stage 28 is shown in detail. It comprises a register 40 that is connected to the output of the preceding stage 27 and a register 41 that is connected to the input of the next stage. The ring advances in two steps in which all register stages operate at the same time. In the first step (arbitrarily), data is transferred from the output of preceding stage 27 to register 40 and from register 41 to the input of the next stage 29. During this step, registers 40 and 41 are isolated from each other and from their associated loads. In the second step, data is transferred within the register stage from register 40 to register 41 and/or between the registers 40 and 41 and the associated load 17. It is a feature of this invention that at each second step, messages of any kind can be placed on the ring or retrieved from the ring. A gate 43 couples the output of register 40 to the input of register 41 for transmitting data through the stage during a second step. A gate 44 couples the output of register 40 to the input of a buffer 46 which transmits data to load 17 during the first step. Similarly during a first step, a gate 45 transfers messages from a buffer 47 to the output register 41. Buffer 47 accumulates messages from load 17 that are to be placed on the ring. Gates 43, 44 and 45 are controlled by a logic circuit 48. Circuit 48 receives the control bits 36, 37 and 38 shown in the message format of FIG. 5 from the output of register 40. A register 49 supplies a comparison address to circuit 48. Ordinarily, the address held in register 49 is the address of the associated load 17.

Circuit 48 is arranged to open gate 44 to transmit a message from register 40 to buffer 46 when the address held by register 40 matches the address held by register 49 and buffer 46 is not full. Messages are ordinarily addressed to a unique load and logic circuit 48 is additionally arranged to close circuit 43 or to otherwise signify in section 38 of the message format that a vacancy exists in register 40 at the end of this operation. If the address in register 40 matches the address held in register 49 but buffer 46 is full, gate 44 is kept closed and gate 43 is opened to maintain the message circulating on the ring until it can be accepted in buffer 46.

Logic circuit 48 is arranged to open gate 45 and close gate 43 to transmit a message from buffer 47 to register 41 when buffer 47 is ready and either a vacancy exists in register 40 or register 40 contains a message addressed to load 17 and buffer 46 is ready to accept the message. Thus, a message can be entered on the ring from load 17 whenever a vacancy enters stage 28 or whenever the operation of load 17 in accepting a message creates a vacancy in stage 28.

An interconnecting stage 53 shown in dashed lines transmits messages between ring 20 and ring 21. Preferably, the interconnecting stage operates as an ordinary register stage for transmitting messages between its neighboring stages within a single ring and it transmits messages from one ring to another in a way that is somewhat analogous to the way that a register stage transmits messages between the associated load and the ring. Registers 50 and 51 and gate 52 transmit messages on ring 20 and they are arranged in the drawing in a way that emphasizes their similarity to registers 40, 41 and gate 43 in register stage 28. For transmitting a message addressed to a load of ring 20, gate 52 is opened and data is shifted from the output of register stage 26 through registers 50 and 51 to the input of register stage 25. Registers 60 and 61 and a gate 62 similarly connect the output of register stage 29 to the input of register stage 27 in ring 21. Gates 57 and 63 correspond approximately to gate 45 in register stage 28 and gates 56 and 64 correspond approximately to gate 44 in stage 28.

Means illustrated as two buffers 68 and 69 transmits messages between the registers 50 and 51 of ring 20 and the registers 60 and 61 of ring 21. Buffer 68 receives messages transmitted through gate 56 from the output of register 50 and it stores the messages for transmission through gate 63 to register 61 of ring 21. Similarly, messages from ring 21 are transmitted through gate 64 to buffer 69 and from buffer 69 through gates 57 to register 51 of ring 20.

The interconnecting stage is controlled by means illustrated as a logic circuit 70 and a logic circuit 71. Logic circuit 70 receives the field 36 in the message held in register 50. This field indicates whether the message is intended for a load on ring 20 or a load on ring 21. Circuit 70 may also receive field 38 to detect that the message is valid. In the example of FIG. 1 where two rings are interconnected, a 0 bit would identify ring 20 and a 1 bit would identify ring 21. A register 72 holds the address of ring 21 and is thus, in part, analogous to register 49 which has already been described. Circuit 70 is arranged to compare the address in register 72 with the address in field 36 of a message in register 50 to determine whether the message is intended for a stage of ring 20 or a stage of ring 21. Circuit 70 is arranged to open gate 52 for transmitting a message from register 50 to register 51 when the message is addressed to a stage of ring 20. Circuit 70 is also arranged to open gate 52 for transmitting a message to stage 25 of ring 20 if the message is addressed to ring 21 but buffer 68 is full.

Circuit 70 is arranged to open gate 56 and transmit a message from register 50 to buffer 68 when buffer 68 is not full and the message is addressed to ring 21. Circuit 70 is arranged to open gate 57 and close gate 52 for transmitting a message from buffer 69 to register 51 when register 50 is vacant and buffer 69 is ready or when register 50 contains a message addressed to ring 21 and buffer 68 is not full and buffer 69 is ready. Circuit 71 is analogously arranged to control gates 62, 63 and 64 according to a comparison of the address field 36 in register 60 and a comparison address held in a register 73 and in accordance with the state of buffers 68 and 69.

From a more general standpoint, registers 72 and 73 contain control bits that are to be compared with control bits in the message and in the embodiments of the invention that will be described next, two or more interconnection stages are provided and the control bits may provide optional routing paths.

Figure 2:
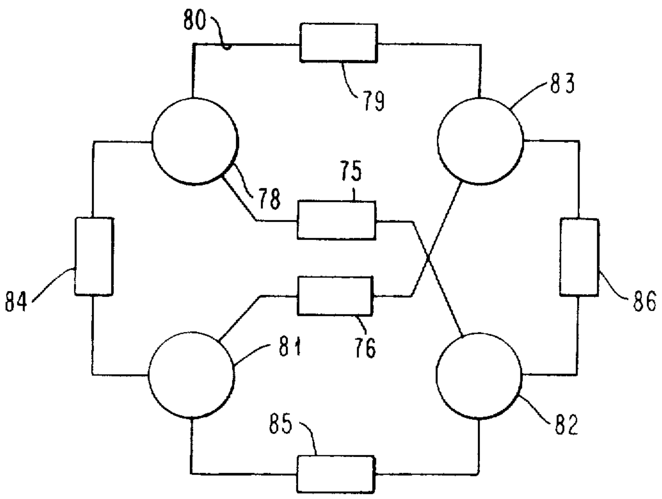
FIGS. 2, 3 and 4 show in simplified form, other configurations of the ring interconnection system of this invention.
Figures 3, 4:
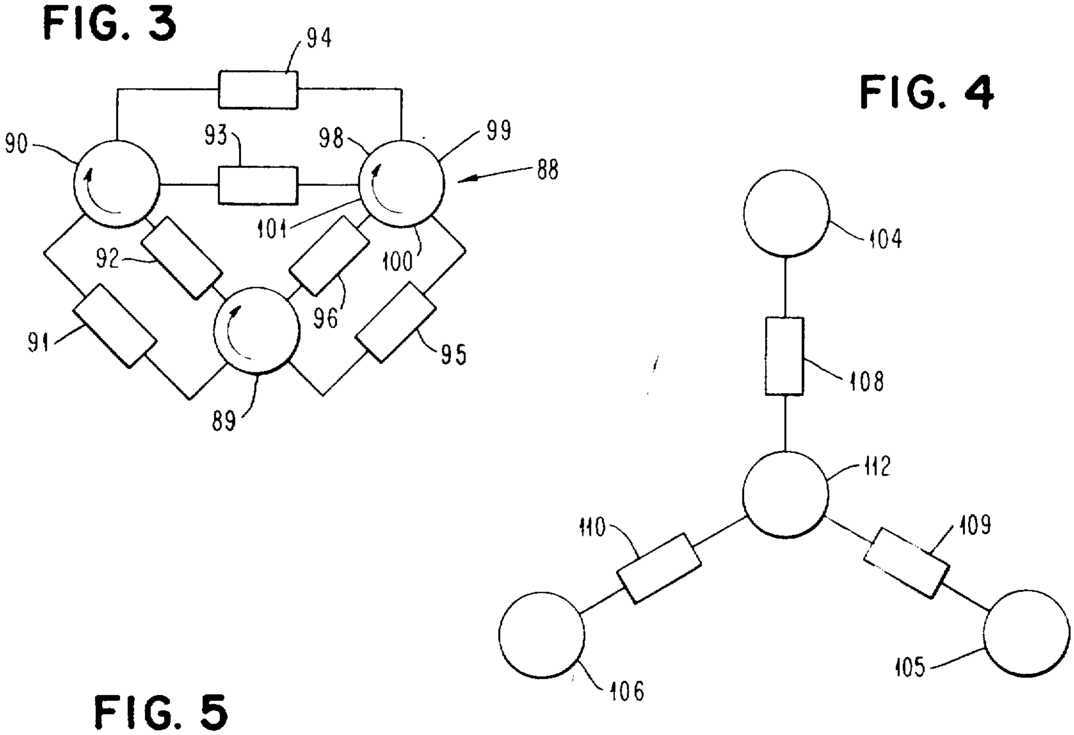

Introduction to FIGS. 2, 3 and 4

FIGS. 2, 3 and 4 show representative variations of the system of FIG. 1. In FIG. 2 a ring of the type illustrated by rings 20 and 21 in FIG. 1 is indicated by a circle 78. The ring includes a selected number of discrete stages that are not individually shown in the schematic representation. A block 79 represents an interconnecting stage. A line 80 shows the connection of stage 79 to ring 78 and also indicates that in the detailed drawing of FIG. 1, components of block 79 would form a stage of ring 78. With this explanation, the relationship of the simplified drawings of FIGS. 2, 3 and 4 to the circuit drawing of FIG. 1, should be apparent.

The System of FIG. 2

In addition to the components of FIG. 2 already introduced, rings 81, 82 and 83 are interconnected in a rectangular pattern by interconnection stages 84, 85 and 86. Rings 78 and 83 communicate through interconnection stage 79 in approximately the same way as the apparatus of FIG. 1. In addition, interconnection stages 75 and 76 make diagonal connections between rings 78, 82 and 81, 83. Logic in the interconnection stages routes messages along the shortest path or along any other selected path according to the address of the messages and the address or addresses held in each of the registers 72, 73 of FIG. 1. From a more general standpoint logic in interconnection stage 79, for example, accepts messages in ring 78 that are not addressed to ring 78 and accepts messages in ring 83 that are not addressed to ring 83.

The system of FIG. 3

In the system of FIG. 3, three rings 88, 89 and 90 are interconnected by six interconnection stages 91 through 96. This system has several advantages. It shortens the distance of each ring between a register stage and an interconnection stage. It increases the number of buffers that the interconnection stages provide. In addition, it permits relatively short sections of an individual ring to be removed and provides alternate routes that are more direct or less congested. For example, suppose that section 98 of ring 88 is inoperable but sections 99, 100 and 101 are operable, and suppose that messages circulate clockwise in each of the rings, as the arrows show. Thus, for example, a message can be shifted from a stage in section 99 through section 100 to a stage in section 101 in the way that has been described for the other embodiments of the invention. However, in this example, ring 88 can not transmit a message from a load of section 101 to a load of section 99. The interconnections of ring 88 to rings 89 and 90 provide alternate pathways for these messages. For example, a message from section 101 of ring 88 can be transmitted through interconnection stage 93 to ring 90 and through interconnection stage 94 to the upstream most operable point of ring 88. Other alternate pathways will be readily apparent. For routing a message addressed to a unit of the same ring as the message originating unit, the address field 36 of FIG. 5 and the comparison address registers 72, 73 of FIG. 1 may be arranged to define the interconnection stages that are to form the message path.

The System of FIG. 4

FIG. 4 shows three rings 104, 105 and 106 that are each connected to a single interconnection stage 108, 109 and 110 as in the system of FIG. 1. The three interconnection stages are each inter-connected in a ring shown in the drawing as 112. This structure can be better understood by comparing FIG. 1 and FIG. 4. Thus, the ring 20 in FIG. 1 corresponds to ring 104 in FIG. 4 and the interconnection stage 53 of FIG. 1 corresponds to interconnection stage 108 of FIG. 4. Ring 112 in FIG. 4 corresponds to the components 60, 61 and 62 of interconnection stage 53 and similar components for interconnection stages 109 and 110 connected in approximately the way that register stages 27, 28 and 29 are connected with components 60, 61 and 62 to form ring 21 in FIG. 1. Ring 112 may include other register stages with associated loads also.

Figure 6:
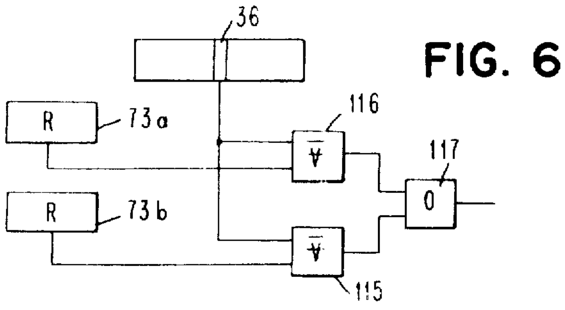
FIG. 6 shows a logic circuit for the ring interconnection systems of FIGS. 2, 3 and 4.

In each embodiment having two or more interconnection stages for one ring, the address compare registers 72 and 73 preferably have one address so that a message in the ring may be transmitted through one or more interconnection stages if necessary to be handled by the ring providing the most advantageous routing. As has already been explained, the messages can be routed for the minimum number of intervening stages, to avoid high priority or high usage paths and to avoid inoperable segments or interconnection stages. The registers 72 and 73 are changeable to achieve a selected routing for messages. For less direct routing paths, an address register 72, 73 can be arranged to hold multiple addresses so as to select messages for both an adjacent ring and a remote ring; for example, portions of the address may be masked or a multiple compare can be provided by well known circuits. FIG. 6 shows two registers 73a, 73b that are similar in function to a register 72 or 73 in FIG. 1. Each contains an address corresponding to the high order address bits 36 that define the destination ring segments for which messages are to be routed through the associated interconnection stage. For example, in stage 92, registers *73a, 73b* might identify messages from ring 89 addressed to segments 98 and 99 respectively of ring 88 in FIG. 3 but not to segments 100 or 101 of the same ring. Complement Exclusive OR circuits 115, 116 compare the message address field 36 with the contents of registers *73a, 73b* and transmit a match signal through OR circuit 117 to a gate (not shown) corresponding to gate 64 in FIG. 1.

Those skilled in the art will recognize many applications for the system of this invention and appropriate modifications within the scope of the claims.

What is claimed is:

1. A ring shift register system for a data processing system comprising:

a plurality of ring connections of shift register stages interconnected to shift a message in a predetermined direction from one stage to another, said message having an address portion defining one of said plurality of rings and a destination unit in the addressed ring, each said stage having register means for holding a message applied to the stage, means for reading an address portion of a message, and means responsive to an address to direct a message to the next stage or to an addressed load associated with the stage, and an interconnection stage connected between a first ring and a second ring and having means to transfer messages from the preceding stage to the next stage of the same ring or to the next stage of an addressed one of the other ring according to the address portion of the message.

2. The system of claim 1 wherein said interconnection stage comprises buffer means, register means for each ring for holding a message transferred to the interconnection stage from the preceding stage of a ring, logic means for comparing the address portion of a message with a predetermined address distinguishing one ring from another, and means responsive to said address comparing means to enter messages into said buffer means.

3. The system of claim 2 wherein said logic means comprises means responsive to a vacancy in said register means for entering a message from said buffer into the addressed ring.

4. The system of claim 3 comprising first, second and third rings, an interconnection stage connecting said first ring to a first point on said third ring, a second interconnection stage connecting said second ring to a second point on said third ring, and means in each said interconnection stage to transfer messages from one ring to another or to the next stage of the same ring according to the address portion of the message.

5. The system of claim 4 comprising a plurality of interconnection stages connecting said first and second rings, the connection of said interconnection stages of said rings defining ring segments having intervening register stages and means in each of said interconnection stages for routing messages from one of said segments to another according to said address.

6. The system of claim 3 comprising a third and a fourth ring, a second interconnection stage connecting said first and third rings, a third interconnection stage connecting said third and fourth rings, and a fourth interconnection stage connecting said fourth and second rings.

7. The system of claim 6 further comprising a fifth interconnection stage connecting said first and fourth rings and a sixth interconnection stage connecting said second and third rings.

8. The system of claim 5 wherein said logic means includes means for comparing the destination address of a message with a plurality of destination ring segment addresses for accepting messages according to a predetermined routing.

9. The system of claim 8 wherein said comparing means comprises means holding a plurality of destination segment addresses and means comparing said segment addresses with a message address for accepting a message according to a predetermined routing.

10. A ring shift register system for a data processing system comprising:

a first, second and third ring of shift register stages, each of said stages having register means for holding a message applied to the stage, means for reading an address portion of a message, gating circuits responsive to said address to direct said message to a next stage of the ring or to remove said message from said ring, and means responsive to a vacancy in said stage for entering messages in the ring, and means interconnecting two of said stages in each ring and one of said stages in each other ring to form interconnection stages in which messages are transferred from ring to ring or to the next stage in the same ring according to the address.

* * * * *